US006535802B1

(12) United States Patent
Kramer

(10) Patent No.: US 6,535,802 B1
(45) Date of Patent: Mar. 18, 2003

(54) QUICK CHECK VEHICLE DIAGNOSTICS

(75) Inventor: Dennis A. Kramer, Troy, MI (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 10/056,474

(22) Filed: Jan. 25, 2002

(51) Int. Cl.[7] ............ G01M 17/00

(52) U.S. Cl. ............ 701/29; 701/31; 701/34; 701/35; 123/471

(58) Field of Search ............ 701/29, 31, 32, 701/34, 35; 123/471

(56) References Cited

U.S. PATENT DOCUMENTS

| | | | | |
|---|---|---|---|---|
| 4,204,255 | A | 5/1980 | Cremer | 701/49 |
| 4,404,641 | A | 9/1983 | Bazarnik | 702/177 |
| 4,441,359 | A | 4/1984 | Ezoe | 73/117 |
| 4,477,874 | A | 10/1984 | Ikuta et al. | 701/49 |
| 4,533,900 | A | 8/1985 | Muhlberger et al. | 349/457.4 |
| 4,660,140 | A | 4/1987 | Illg | 700/79 |
| 4,707,788 | A | 11/1987 | Tashiro et al. | 701/49 |
| 4,731,769 | A | 3/1988 | Schaefer et al. | 369/6 |
| 4,739,482 | A | 4/1988 | Wrigge | 701/30 |
| 4,773,011 | A | 9/1988 | VanHoose | 701/30 |
| 4,787,041 | A | 11/1988 | Yount | 701/3 |
| 4,926,331 | A | 5/1990 | Windle et al. | 701/35 |
| 4,939,652 | A | 7/1990 | Steiner | 701/35 |
| 4,975,847 | A | 12/1990 | Abe et al. | 701/32 |
| 5,046,007 | A | 9/1991 | McCrery et al. | 701/35 |
| 5,091,856 | A | 2/1992 | Hasegawa et al. | 701/36 |
| 5,253,052 | A | 10/1993 | Hanashiro et al. | 375/240.12 |
| 5,365,436 | A | 11/1994 | Schaller et al. | 701/33 |
| 5,400,018 | A | 3/1995 | Scholl et al. | 340/10.3 |
| 5,475,399 | A | 12/1995 | Borsuk | 345/472 |
| 5,479,347 | A | 12/1995 | Oguro et al. | 701/35 |
| 5,555,171 | A | 9/1996 | Sonehara et al. | 701/33 |
| 5,680,328 | A | 10/1997 | Skorupski et al. | 701/35 |
| 5,778,381 | A | 7/1998 | Sandifer | 701/104.1 |
| 5,787,373 | A | 7/1998 | Migues et al. | 701/33 |
| 5,797,107 | A | 8/1998 | Berg et al. | 701/29 |
| 5,801,767 | A | 9/1998 | Wu | 348/190 |
| 5,812,399 | A | 9/1998 | Judic et al. | 701/49 |
| 5,848,365 | A | 12/1998 | Coverdill | 701/35 |
| 5,859,628 | A | 1/1999 | Ross et al. | 345/173 |
| 5,916,286 | A | 6/1999 | Seashore et al. | 701/29 |
| 5,931,878 | A | 8/1999 | Chapin, Jr. | 701/30 |
| 5,933,125 | A | 8/1999 | Fernie et al. | 345/8 |
| 5,948,026 | A | 9/1999 | Beemer, II et al. | 701/35 |
| 5,961,561 | A | 10/1999 | Wakefield, II | 701/29 |
| 5,964,813 | A | * 10/1999 | Ishii et al. | 701/35 |
| 5,990,800 | A | 11/1999 | Tamaki et al. | 340/679 |
| 6,003,808 | A | 12/1999 | Nguyen et al. | 244/1 R |

(List continued on next page.)

OTHER PUBLICATIONS

Specification for Serial No. 09/767999 filed Jan. 23, 2001.
Specification for Serial No. 09/591970 filed Jun. 12, 2000.

(List continued on next page.)

*Primary Examiner*—William A. Cuchlinski, Jr.
*Assistant Examiner*—Marthe Y. Marc-Coleman
(74) *Attorney, Agent, or Firm*—Carlson Gaskey & Olds

(57) ABSTRACT

A vehicle data storage system in communication with a diagnostic unit provides a "quick fault" screen which summarizes event data stored within a storage device of the vehicle data storage system. The "quick fault" screen displays a plurality of keys organized in matrix format to display an overview of fault conditions through animation and/or coloring of each key in response to the event data stored within the storage device. By selecting any animated/colored key, a more detailed representation of the event data stored in the storage device for the particular fault condition is presented. The detailed subsystem screen presents the event data recorded within the storage device in a graphical and/or tabulation format showing associate subsytem parameters over time.

24 Claims, 3 Drawing Sheets

U.S. PATENT DOCUMENTS

| | | | | | |
|---|---|---|---|---|---|
| 6,006,147 | A | | 12/1999 | Hall et al. | 701/29 |
| 6,006,148 | A | | 12/1999 | Strong | 701/33 |
| 6,009,363 | A | | 12/1999 | Beckert et al. | 701/33 |
| 6,052,631 | A | | 4/2000 | Busch et al. | 701/29 |
| 6,055,468 | A | | 4/2000 | Kaman et al. | 701/29 |
| 6,073,063 | A | | 6/2000 | Leong Ong et al. | 701/35 |
| 6,084,567 | A | | 7/2000 | Ogawa | 345/690 |
| 6,104,971 | A | | 8/2000 | Fackler | 701/36 |
| 6,212,449 | B1 | * | 4/2001 | Wellman et al. | 701/29 |
| 6,285,931 | B1 | * | 9/2001 | Hattori et al. | 701/29 |

OTHER PUBLICATIONS

Specification for Serial No. 09/716718 filed Nov. 20, 2000.
Specification for Serial No. 09/850455 filed May. 07, 2001.
Specification for Serial No. 09/767930 filed Jan. 22, 2001.
Specification for Serial No. 09/924435 filed Aug. 08, 2001.
Specification for Serial No. 09/767932 filed Jan. 23, 2001.
Specification for Serial No. 09/522352 filed Mar. 09, 2000.

* cited by examiner

QUICK CHECK VEHICLE DIAGNOSTICS

BACKGROUND OF THE INVENTION

The present invention relates to data collection from a vehicle, and more particularly to a data collection system which provides an overview of vehicle subsystems to quickly extract on-board data and identify the severity of any vehicle subsystem faults.

Commonly, on-board data recorders gather vehicle information from a plurality of vehicle subsystems such as the engine, the transmission and the braking system among others. Such data recorders are specifically applicable to heavy duty vehicles for analysis by a fleet operations facility. The data is stored on-board the vehicle for later examination and tracking should a problem with the particular subsystem develop.

Each particular subsystem typically requires a separate extraction and analysis software package to review the stored data. A technician must therefore be familiar with the software package and data presentation format of each particular subsystem. The data from each particular subsystem is commonly provided in a spreadsheet like format which may be time consuming and difficult to analyze. The technician may therefore avoid performing a full diagnostic on each individual subsystem until a subsystem problem is identified by a vehicle operator. Such identification typically may not occur until the underlying subsystem problem has become acute. Such identification is less than ideal.

Accordingly, it is desirable to provide an overview of vehicle subsystems to identify the severity of any faults of all vehicle subsystems in a timely manner.

SUMMARY OF THE INVENTION

A vehicle data storage system in communication with a diagnostic unit according to the present invention provides a "quick fault" screen which summarizes data stored within a storage device of the vehicle data storage system. The "quick fault" screen displays a plurality of keys organized in matrix format to display an overview of vehicle subsystem faults conditions through animation and/or coloring of each key in response to event data stored within the storage device.

Should no problematic vehicle operating conditions be recorded, all of the keys in the "quick fault" screen will be colored green to indicate all subsystems are operating satisfactory. A technician is thereby rapidly apprised of the vehicle subsytems status upon connection of a data interface between the diagnostic unit and vehicle data storage system. No laborious spreadsheet-like analysis is required to determine that all subsystems are operating satisfactory.

Should one or more of the subsystem control modules recognize a problematic vehicle operating condition, the event data therefrom will be stored in the storage device. The associated key on the "quick fault" screen will then be animated/colored as appropriate to the fault condition. For example only, a yellow key will represent a single occurrence of a triggering event while a red key will represent multiple triggering events for that fault condition.

By selecting any animated/colored key, a more detailed representation of the event data stored in the storage device for the particular subsystem is represented. The detailed subsystem screen presents the event data recorded within the storage device in a graphical and/or tabulation format showing associated subsystem parameters over time.

The present invention presents an overview of all the subsystems and, if desired, a detailed report of the faulted subsystems by selecting the animated/colored key. By then reviewing the more detailed information for the faulted subsystem, the technician can quickly reach an initial determination of whether further investigation is warranted.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
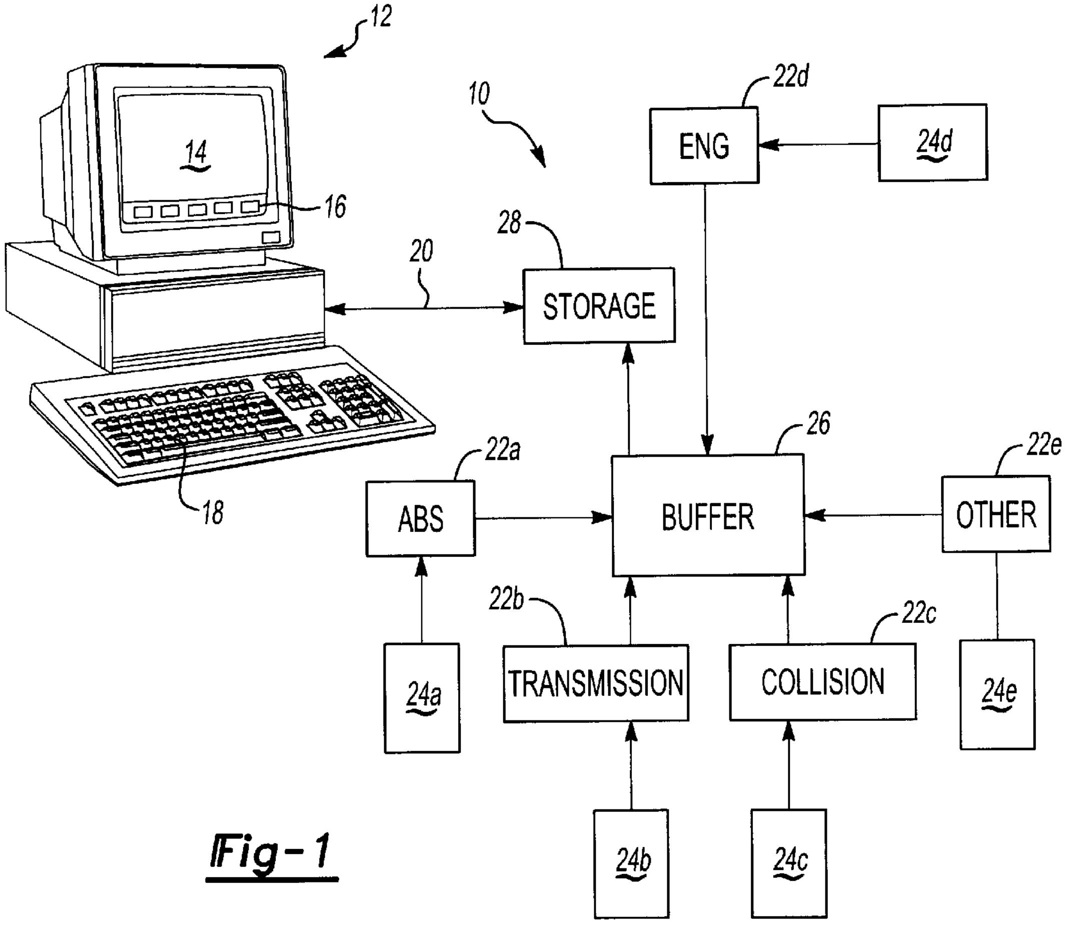
FIG. 1 is a schematic view of one embodiment of the present invention vehicle diagnostic unit.

FIG. 1 illustrates a general schematic view of a vehicle data storage system 10 in communication with a diagnostic unit 12. The diagnostic unit 12 is preferably a personal computer, however, other dedicated units will also benefit from the present invention. The diagnostic unit 12 includes a display screen 14, preferably a touch screen and a character input screen portion 16 for inputting alphanumeric characters onto the screens 14 and 16. Additionally, an input 18 such as a keyboard, mouse, trackball, remote or the like may also be used to communicate with the diagnostic unit 12. The diagnostic unit 12 includes a data interface 20 for connection to a vehicle databus such as a type J1708 or J1939 databus.

The vehicle data storage system 10 includes a plurality of subsystem control modules such as an ABS brake control module **22*a*, a transmission control module 22*b*, a collision avoidance control module 22*c*, an engine control module 22*d*, or any other type of control module 22*e*. A plurality of sensors 24*a*, 24*b*, 24*c*, 24*d*, and 24*e* correspondingly communicate with the subsystem control modules 22*a*, 22*b*, 22*c*, 22*d* and 22*e*** to provide information about the particular vehicle subsystem. Traditionally, the subsystem control modules were able to be accessed through vehicle databus in only a very limited manner. With the present invention, subsystem control modules are more accessible to make information more available for analysis.

The sensors 24 sense vehicle operating conditions such as temperatures, pressures, valve positions or any other condition. The subsystem control modules translate the vehicle operating conditions into corresponding vehicle information. Vehicle information may include but is not limited to vehicle speed, engine speed, gear position, fluid levels, brake temperatures, bearing temperatures, vehicle load, battery voltage, and brake status in addition to other vehicle information. The combined vehicle information from all of the subsystem control module systems 22 is sent to a memory buffer 26. As the memory buffer 26 becomes full, the new vehicle information from the subsystem control modules 22 will overwrite the information already contained on the memory buffer 26.

The subsystem control modules 22 are programmed to recognize fault conditions or problematic vehicle operating conditions. For example, if an engine temperature is high or out of a predetermined range, the engine control module 22*d* will recognize the high engine temperature as a triggering event. When a triggering event has been recognized by a subsystem control module 22, the subsystem control module 22 will direct or command the buffer 26 to transmit the event data surrounding the triggering event to a secondary storage device 28.

The event data is defined by a first predetermined time before the triggering event to a second predetermined time after the triggering event. That is, the event data includes vehicle information previous to the triggering event which has been stored within buffer 26, for example, from two minutes before the triggering event to two minutes after the triggering event. However, it is to be understood that the event data may be defined in any number of ways. In addition to the particular subsystem event data, other vehicle information data such as vehicle speed, odometer reading, gear selection, environmental conditions such as temperature and the like, may also be recorded.

Unlike some prior art devices, the present invention commands the transfer from event data from the memory buffer in response to a request signal from the subsystem control module having the triggering event. For example, if a temperature sensor 24*d* detects an engine over temperature condition, the engine controller 22*d* will send a request signal to the memory buffer 26 to send the event data to the secondary storage device 28. In this manner, each subsystem control module need not be polled for vehicle information.

Preferably, the secondary storage device 28 is of a large enough capacity to store a rather large quantity of data equivalent to months of vehicle operation. Event data is thus available from a single source. The event data stored within the secondary storage device 28 has heretofore been available in a spreadsheet like format which requires detailed and time intensive analysis.

Figure 2:
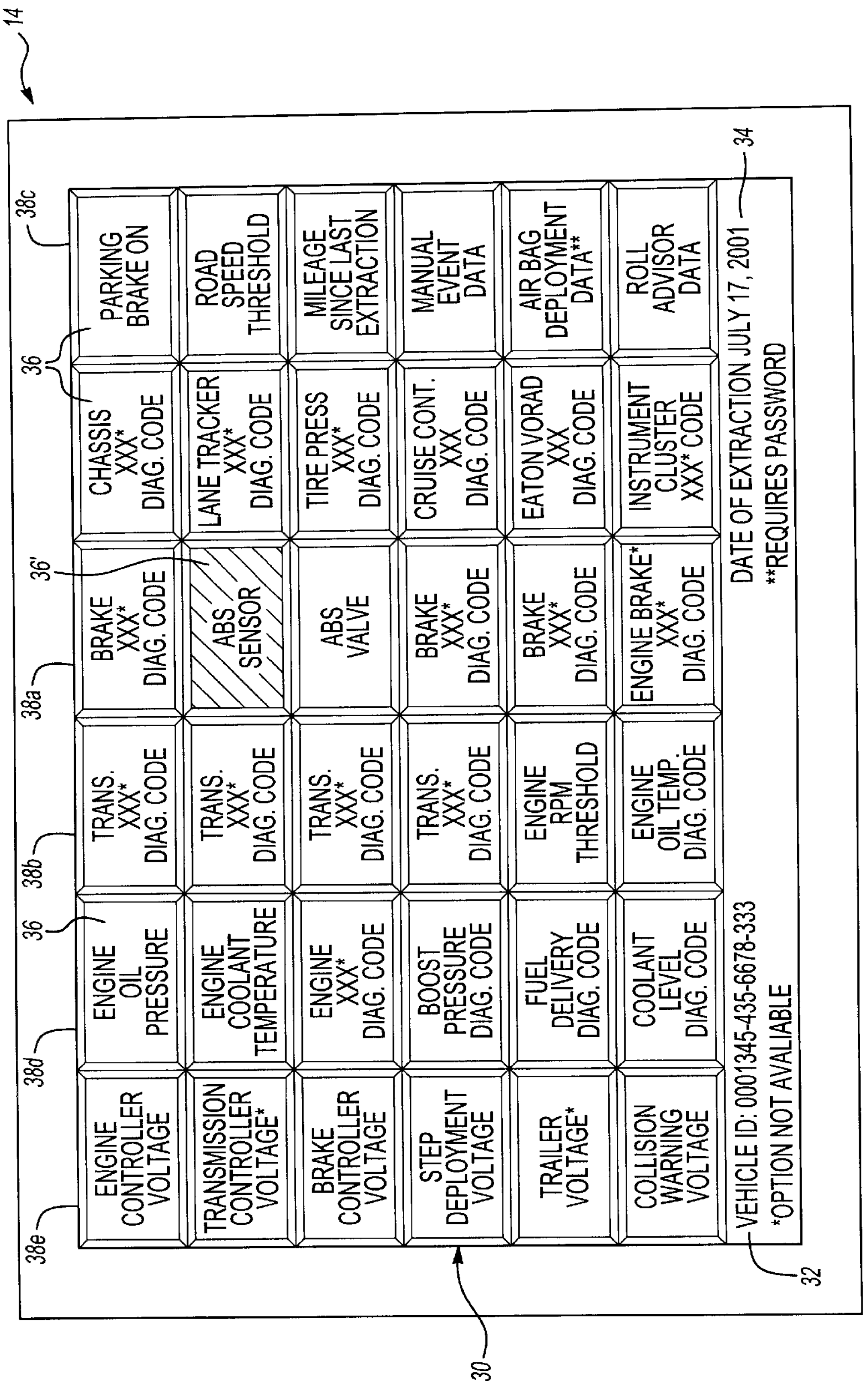
FIG. 2 is a screen display of a "quick fault" screen of the vehicle diagnostic unit in FIG. 1.

Referring to FIG. 2, the display screen 14 of the diagnostic unit 12 is illustrated. The diagnostic unit 12 preferably displays a "quick fault" screen 30 which summarizes the data stored within the secondary storage device 28. The quick fault screen 30 includes a vehicle ID tag 32 and the date of extraction 34. Other status like information such as maintenance facility location, technician name, and the like may alternatively or additionally be included.

The "quick fault" screen 30 displays a plurality of keys 36 preferably organized in matrix format. The term "key" should be construed broadly to include touch screen buttons, physical buttons, and other selectable devices. The keys 36 are preferably separated into clusters related to particular vehicle subsystems such as a brake cluster 38*a*, a transmission cluster 38*b*, a collision avoidance cluster 38*c* an engine cluster 38*d*, or any other type of cluster 38*e*. It should be understood that other arrangements and organizations will also benefit from the present invention.

Each key 36 preferably represents a fault condition of a vehicle subsystem control module. That is, each control module 22 may have a multiple of fault conditions associated with it. Each fault condition represents a compilation of event data which has been recorded to the secondary storage 26 due to one or more triggering event occurrences. That is, the event data from a multiple of problematic vehicle operating conditions identified by, for example, the engine subsystem control module 22*d* (FIG. 1) would be compiled into one or more fault conditions, each represented by a key 36. Compilations of the event data from multiple triggering events is readily accomplished through known software packages.

The "quick fault" screen 30 preferably displays an overview of the fault conditions through animation and/or coloring of each key 36 in response to the data stored within the secondary storage device 28. Known software packages running under a standard operating system can be used to extract information from the data as stored in the secondary storage device 28 and provide the associated animation/coloring in the inventive manner according to the present invention.

Should no problematic vehicle operating conditions be recorded within the secondary storage device 28, none of vehicle subsystems experienced a triggering event. Each of the keys 36 on the "quick fault" screen 30 will preferably be colored green to indicate all subsystems are operating satisfactory. The technician is thereby rapidly apprised of the vehicle subsytems status upon connection of the data interface 20 between the diagnostic unit 12 and vehicle data storage system 10. No laborious analysis is required to determine that all subsystems are operating satisfactory. The present invention thereby promotes preemptive subsystem diagnostic checks by providing for a quick subsystem overview when the vehicle undergoes routing maintenance such as an oil change or the like.

Should one or more of the subsystem control modules 22 recognize a problematic vehicle operating condition, the event data therefrom will be stored in the secondary storage device 28. The event data, which has been compiled as described above, will then be associated to one or more fault conditions. The key 36 on the "quick fault" screen 30 associated with that fault condition will then be animated/colored, i.e., will not be colored green. Preferably, the animation/coloring will be appropriate to the subsystem data stored in the secondary storage device 28. That is, the animation/coloration represents the severity of the fault condition for each subsystem. For example only, a key 36 representative of a particular fault condition for a particular subsystem will be colored yellow if the event data comprises a single triggering event. The same key 36 will be colored red if the event data comprises a multiple of triggering events. The same key may be blinking if the multiple triggering events occurred within a predetermined time period, etc. It should be understood that other animation/coloration representations for problem hierarchies will also benefit from the present invention.

In FIG. 2, key 36' represents the ABS sensor subsystem. Due to the ABS sensor subsytem event data stored in the secondary storage device 28, diagonal lines are superimposed over the ABS sensor subsystem key 36'. The ABS sensor key 36' may alternatively or additionally be colored in a certain manner to provide an extremely informative problem hierarchy.

Figure 3:
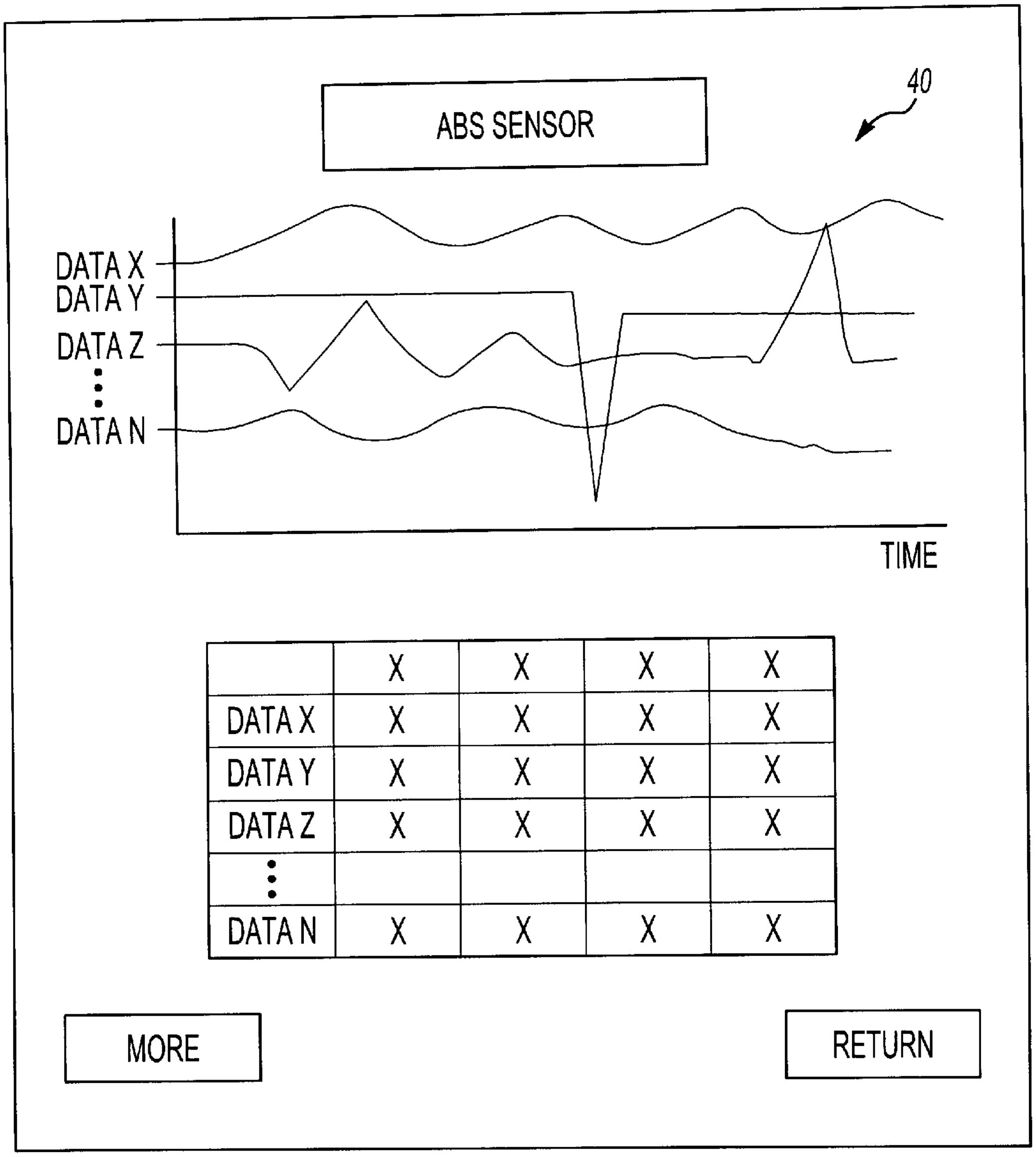
FIG. 3 is a screen display of one subsystem selected from the "quick fault" screen of FIG. 2.

Preferably, by selecting any animated/colored key 36, a more detailed representation of the event data stored in the secondary storage device 28 for the particular subsystem is represented by a detailed subsystem screen 40 (FIG. 3). The detailed subsystem screen preferably presents the subsystem data recorded within the secondary storage device 28 in a graphical and/or tabulation format showing associated subsystem parameters over time. It should be understood that other information related to the triggering event may alternatively or additionally provided for printing, storing, and transferring to other diagnostic devices or programs The present invention presents an overview of all the subsystems and, if desired, a detailed subsystem report of the faulted subsystem simply by selecting the animated/colored key. By then reviewing the more detailed information for the faulted subsystem, the technician can reach an initial determination of whether further investigation is warranted.

Furthermore, it is understood that the present invention is not limited to a microprocessor based control system. The system may be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle diagnostic system comprising:

a storage device in communication with a plurality of vehicle subsystem control modules;

a diagnostic unit in communication with said storage device; and a display in communication with said diagnostic unit to simultaneously display a plurality of keys, each of said keys representative of a fault condition for one of said plurality of vehicle subsystem control modules, each of said keys comprsing an alphanumeric description of said fault condition associated therewith.

2. The vehicle diagnostic system as recited in claim 1, wherein each of said keys is colored in response to said fault condition.

3. The vehicle diagnostic system as recited in claim 1, wherein each of said keys is animated in response to said fault condition.

4. The vehicle diagnostic system as recited in claim 1, wherein said fault condition comprises event data stored within said storage device.

5. The vehicle diagnostic system as recited in claim 4, further comprising a buffer memory in communication with said storage device, said buffer memory storing said event data relative to a time.

6. The vehicle diagnostic system as recited in claim 5, wherein one of said plurality of vehicle subsystem control modules direct said buffer memory to store said event data to said storage device in response to a triggering event identified by said one of said plurality of vehicle subsystem control modules.

7. The vehicle diagnostic system as recited in claim 1, further comprising a detailed subsystem screen associated with each of the plurality of keys and said fault conditions associated therewith, said detailed subsystem screen viewable by selection or each of said plurality of keys.

8. The vehicle diagnostic system as recited in claim 1, wherein said diagnostic unit and said display are external from said storage device.

9. The vehicle diagnostic system as recited in claim 1, wherein said keys are organized in matrix format.

10. The vehicle diagnostic system as recited in claim 9, wherein said keys are separated into clusters related to particular vehicle subsystems.

11. The vehicle diagnostic system as recited in claim 1, wherein said keys summarize event data stored within said storage device.

12. The vehicle diagnostic system as recited in claim 1, wherein said description comprises a diagnostic code.

13. The vehicle diagnostic system as recited in claim 1, wherein each of said fault conditions represents a compilation of event data stored in said storage device due to one or more triggering event occurrences.

14. A method of displaying vehicle diagnostic data comprising the stops of:

(1) communicating with a vehicle storage device in communication with a plurality of vehicle subsystem control modules;

(2) simultaneously displaying a plurality of keys, each of the plurality of keys comprising an alphanumeric description of a fault condition associated therewith, each of said keys associated with one of said plurality of vehicle subsystem control modules;

(3) identifying the fault condition associated with each of the plurality of vehicle subsystem control modules; and (4) modifying each of the plurality of keys in response to each of the plurality of keys associated fault condition identified in said step (3).

15. A method as recited in claim 14, wherein said step (4) further comprises coloring each of the plurality of keys in response to the fault condition of said step (3).

16. A method as recited in claim 14, wherein said step (4) further comprises animating each of the plurality of keys in response to the fault condition of said step (3).

17. A method as recited in claim 14, wherein said step (4) is performed in accordance with a predetermined problem hierarchy.

18. A method as recited in claim 14, further comprising the steps of:

storing a plurality of vehicle operating conditions relative to time in a buffer; and storing the vehicle operating conditions from the buffer to the vehicle storage device in response to a triggering event determined by one of the plurality of vehicle subsystems.

19. A method as recited in claim 8, wherein said step (2) further comprises organizing the plurality of keys in a matrix format.

20. A method as recited in claim 19, further comprising separating the plurality of keys into clusters within the matrix format, each of the clusters related to a particular vehicle subsystem.

21. A method as recited in claim 14, wherein said step (4) further comprises displaying a diagnostic code upon each of the plurality of keys in response to the fault condition.

22. A method as recited in claim 14, further comprising the steps of:

(a) selecting one of the plurality of keys; and (b) displaying a detailed subsystem screen associated with the fault condition associated with the selected key of said step (a).

23. A method as recited in claim 22, wherein said step (b) further comprises displaying subsystem data associated with the fault condition from the vehicle storage device.

24. A method as recited in claim 22, wherein said step (b) further comprises displaying subsystem data associated with the fault condition from the vehicle storage device over a predetermined time period.

* * * * *

UNITED STATES PATENT AND TRADEMARK OFFICE
CERTIFICATE OF CORRECTION

PATENT NO. : 6,535,802 B1
DATED : March 18, 2003
INVENTOR(S) : Dennis A. Kramer

It is certified that error appears in the above-identified patent and that said Letters Patent is hereby corrected as shown below:

Column 5,
Line 56, "or" should be -- of --.

Column 6,
Line 8, "stops" should be -- steps --.
Line 42, "8" should be -- 14 --.

Signed and Sealed this

Nineteenth Day of August, 2003

JAMES E. ROGAN
*Director of the United States Patent and Trademark Office*